United States Patent [19]

Sim et al.

[11] Patent Number: 4,547,296

[45] Date of Patent: Oct. 15, 1985

[54] HEEL RECOVERY FILTRATION PROCESS AND APPARATUS

[75] Inventors: F. Thomas Sim, Stamford; Louis D. Ancillai, Milford; Carson Leikam, Trumbull, all of Conn.

[73] Assignee: Croll-Reynolds Engineering Co., Inc., Trumbull, Conn.

[21] Appl. No.: 532,493

[22] Filed: Sep. 15, 1983

[51] Int. Cl.⁴ .................. B01D 29/38; B01D 29/32
[52] U.S. Cl. ............................ 210/778; 210/798; 210/808; 210/323.2
[58] Field of Search ............ 210/90, 193, 323.2, 210/333.01, 741, 777, 778, 808, 797, 798, 108

[56] References Cited

U.S. PATENT DOCUMENTS

| | | | |
|---|---|---|---|
| 3,037,635 | 6/1962 | Boorujy | 210/193 |
| 3,149,072 | 9/1964 | Silverman | 210/323.2 |
| 3,151,071 | 9/1964 | Kasten | 210/323.2 |
| 3,253,714 | 5/1966 | Quinlan et al. | 210/333.01 |
| 4,405,446 | 9/1983 | Giannelli et al. | 210/323.2 |

OTHER PUBLICATIONS

Filtration & Separation Journal, Jan./Feb. 1970, pp. 67-75, Walton, H. G., *Selecting the Correct Filter Using Filter-Aids.*

*Primary Examiner*—Benoit Castel
*Attorney, Agent, or Firm*—Bierman, Peroff & Muserlian

[57] ABSTRACT

A novel process for removing suspended solids from a liquid without loss of heel portion comprising circulating a suspension of a precoat filter aid through a closed chamber provided with at least one vertical tubular, liquid pervious filter aid retainer supported on a tube sheet with the lower pervious section level with said tube sheet until a filter cake is formed on said retainer, pumping a liquid with suspended solids through the chamber whereby clear liquid passes through said filter cake into said retainer where clear liquid is recovered and suspended solids are deposited on filter cake, continuing pumping liquid with suspended solids until a maximum differential pressure is reached, reduce the pumping rate of liquid while simultaneously increasing air pressure to a maximum of 15 psig in the chamber, draining liquid from the chamber through the filter cake and retainer while maintaining air pressure of 2 to 15 psig to recover the heel portion, abruptly back washing liquid through the retainer and filter cake whereby the filter cake is destroyed and draining the mixture of filter cake and back wash liquid from the chamber and a novel apparatus for performing the said process.

5 Claims, 2 Drawing Figures 4,547,296

HEEL RECOVERY FILTRATION PROCESS AND APPARATUS

STATE OF THE ART

Many liquids are filtered in order to remove suspended solids by building a filter cake of filter aid precoat on a wire screen filter element such as that described in commonly assigned U.S. Pat. No. 3,253,714 and passing the liquid through the filter cake. After a period of operation, the filtration process has to be halted to replace the filter cake since it becomes clogged Most prior processes required a back wash step which resulted in the loss of heel or liquid in the system when the filtration process is stopped.

Losses of this nature may be tolerated when the liquid being filtered is inexpensive such as cooling water in a generating plant but when the liquid being treated is valuable as occurs in the cosmetic and pharmaceutical industries, the losses can not be tolerated.

One attempt to solve this problem is illustrated by a filter system with porous carbon filter elements suspended in a tank with a sloped base or tube sheet but it was found that during draining of the heel, the filter cake would slide down the filter element and break, contaminating the heel. In a second construction, the tubular filter elements were arranged on a horizontal tube sheet so that the filter cake would not break away but problem arose in draining the heel from the system.

OBJECTS OF THE INVENTION

It is an object of the invention to provide an improved process for removing suspended solids from a liquid without loss of heel portion.

It is another object of the invention to provide a novel apparatus for the removal of suspended solids from a liquid without loss of any heel portion.

These and other objects and advantages of the invention will become obvious from the following detailed description.

THE INVENTION

The process of the invention for removing suspended solids from a liquid without loss of heel portion comprises circulating a suspension of a precoat filter aid through a closed chamber provided with at least one vertical tubular, liquid pervious filter aid retainer supported on a tube sheet with the lower pervious section level with said tube sheet until a filter cake is formed on said retainer, pumping a liquid with suspended solids through the chamber whereby clear liquid passes through said filter cake into said retainer where clear liquid is recovered and suspended solids are deposited on filter cake, continuing pumping liquid with suspended solids until a maximum differential pressure is reached, reducing the pumping rate of liquid while simultaneously increasing air pressure to a maximum of 15 psig in the chamber, draining liquid from the chamber through the filter cake and retainer while maintaining air pressure of 2 to 15 psig to recover the heel portion, abruptly back washing liquid through the retainer and filter cake whereby the filter cake is destroyed and draining the mixture of filter cake and back wash liquid from the chamber.

The required amount of filter aid may be mixed in a separate tank with water but is preferably mixed directly with the liquid containing the suspended solids. The said mixture can then be recycled between the closed chamber with the filter elements and the mixing tank until the filter cake is the desired thickness and the liquid passing therethrough is clear in a filter sight glass. At this point, the recirculating valve is closed and the valve to the clear tank is opened and the filtration is continued until the liquid is completely cleaned or the filter cake capacity is exceeded as indicated by an increase in differential pressure.

To stop the filtration, the pumping rate of liquid is reduced while simultaneously increasing the air pressure in the closed chamber up to a maximum of 15 psig which is necessary to maintain the filter cake on the filter elements. The liquid remaining in the chamber is the heel portion and is drained from the chamber into the clean tank or another tank while keeping the air pressure at 2 to 15 psig. If the air pressure is below 2 psig, the liquid will not drain or will drain too slowly and if the pressure is more than 15 psig, the air will pass through the filter cake when the top of the filter elements is exposed and the remaining liquid will not be recovered.

The back washing of the retainer and filter cake is effected abruptly so that the filter cake is broken up and washed off the filter retainer or element and the wash liquid and suspended filter aid from the cake may be washed out of the chamber.

The back wash may be effected by connecting the interior of the filter retainer with a tank filled with wash liquid under pressure and opening a back wash valve to allow the wash liquid to forcibly pass through the filter retainer and to break the filter cake therefrom.

The process of the invention allows complete recovery of the heel remaining in the filter system at the end of the cycle as filtered liquid and there is no need to reprocess the heel. The back wash step is simple and does not require the manpower and time required for the cleaning of flat leaf filters. Maintenance is simple since there are no moving parts except valves which can wear out and have to be replaced and the apparatus is compact, requiring a minimum amount of floor space.

The novel apparatus of the invention is comprised of a closed chamber provided with at least one vertical, tubular, liquid pervious filter aid retainer element supported on a horizontal tube sheet with the lowest pervious section being level with the tube sheet connected to a tank for the liquid to be cleaned, means for removing cleaned liquid from the interior of retainer element, means for supplying air pressure to the closed chamber while simultaneously reducing the pumping rate of liquid, means for providing back wash liquid to the interior of the filter retainer element and means for draining the closed chamber.

DESCRIPTION OF THE PREFERRED EMBODIMENTS

Figure 1:
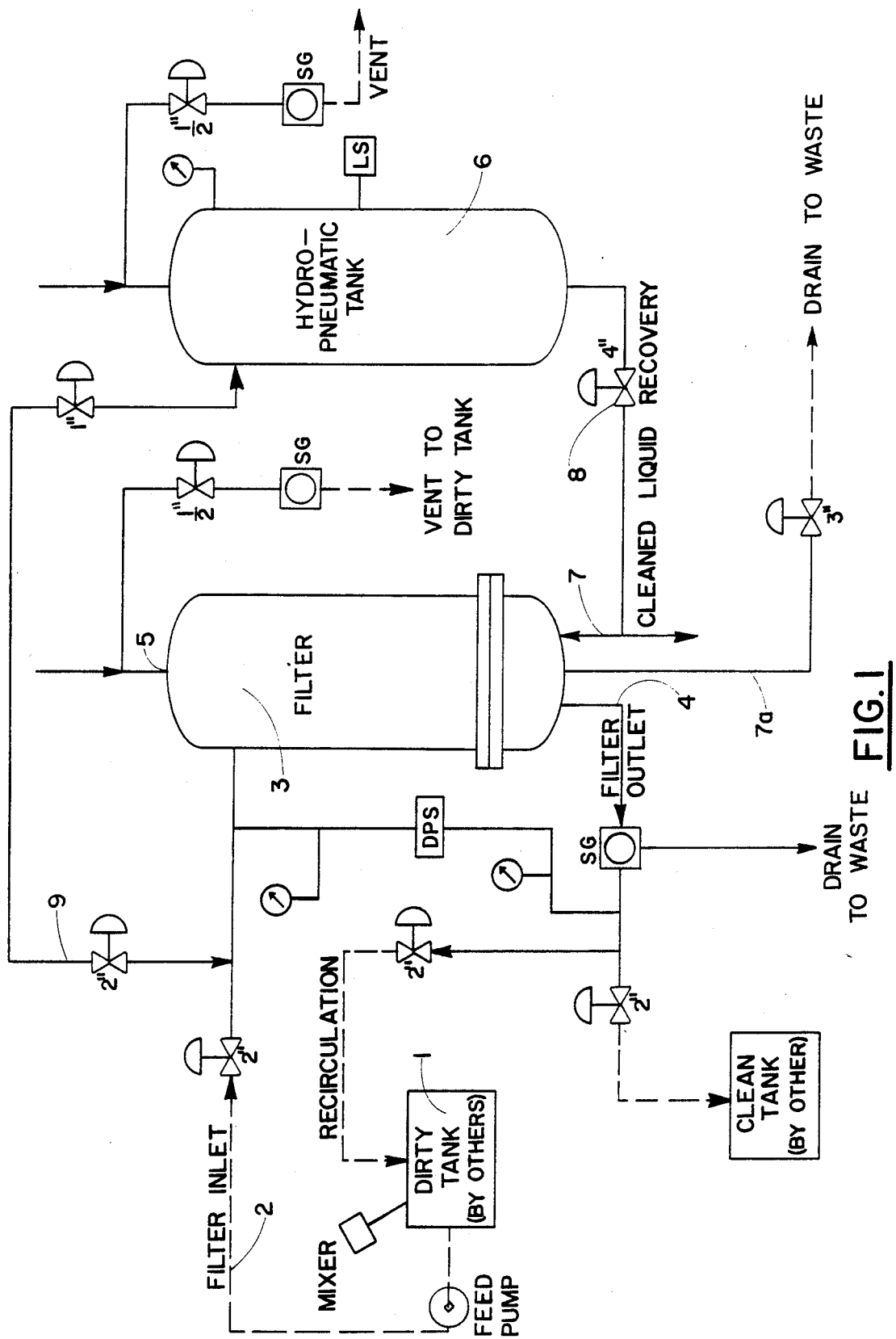
FIG. 1 is a schematic illustration of one embodiment of an apparatus for the process of the invention.

In the apparatus of FIG. 1, Tank 1 which holds the liquid with suspended solids to be cleaned is connected by line 2 to filter 3 which is connected by line 4 to tank 1 for recirculation of the liquid with suspended solids and suspended filter aid to build up the filter cake on the filter retainer elements. The filter at its top is provided with inlet 5 to vent the filter 3 during start up and to add air pressure to the filter 3 during the draining operation. A holding tank 6 is connected to the interior of the filter retainer elements by line 7 which also allows the recovery of cleaned liquid. Tank 6 is filled with back wash liquid under sufficient pressure so that when the valve 8 connecting the tank 6 to the filter is opened, the liquid will pass from tank 6 to filter 3 with sufficient velocity to remove the filter aid from the retainer element. Wash water can be added by line 9 to wash out the filter 3 after the back wash step through drain 7a.

Figure 2:
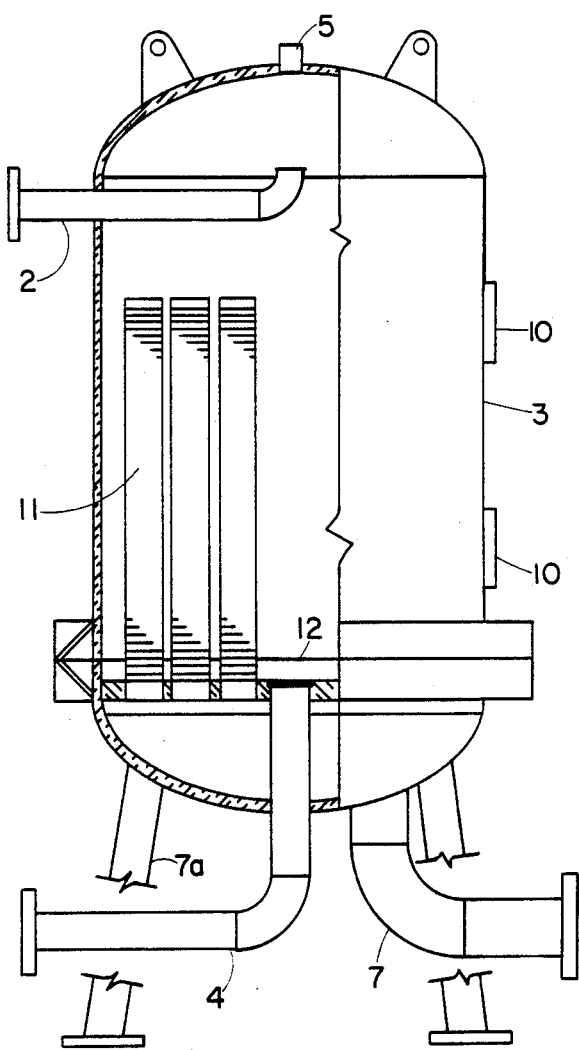
FIG. 2 is a cross-section of a suitable filter for the apparatus of FIG. 1.

FIG. 2 shows the interior of filter 3 which is provided with sight glasses 10 and inlet line 2 is preferably at the upper portion of the filter above the filter retainer elements 11 which are connected to horizontal tube sheet 12 so that the lowest pervious portion of elements 11 is level with the tube sheet 12 which is essential to the operation of the process of the invention. If the lowest pervious section is spaced above tube sheet 12, the filter cake on elements will slide down to the tube sheet during the draining step and break apart, thereby contaminating the heel still in the filter.

While the filter retainer elements have been indicated as being tubular, it does not mean that they have to have a circular cross-section although this is preferred. The cross-section could have any suitable cross-section such as oval or rectangular. The filter retainer elements are preferably wedge wire elements such as described in U.S. Pat. No. 3,253,714 with a suitable spacing between the wires to permit passage of liquid therethrough while retaining suspended filter aid to permit the formation of a filter cake.

In the following example there are described several preferred embodiments to illustrate the invention. However, it is to be understood that the invention is not intended to be limited to the specific embodiments.

EXAMPLE

Using the apparatus of FIG. 1, a filter with a capacity of 150 gallons containing 26 filter retainer elements 30 inches long and having a diameter of 2⅜ inches with wedge wires spaced 0.001 inches apart was filled with liquid with suspended solids to be removed and suspended filter aid while venting the filter and the liquid was recirculated between the holding tank 1 and filter 3 until the liquid passing through the filter retainer was clean, viewing through the sight glass showed a buildup of filter aid on the retainer elements and this took approximately 5 minutes. Valves were then closed to stop recirculation and opened to obtain cleaned liquid.

At the end of the filtering operation, the pumping of liquid to the filter was reduced to zero while simultaneously admitting air at the top of the filter and then the air pressure was maintained at 2 to 15 psig preferably about 6 to 8 psig, while draining liquid from the filter. When the filter was empty, the air pressure was released and tank 6 containing wash water under pressure, i.e. 60 to 100 psig was connected to filter 3 by opening the valve 8 quickly. The compressed air in the hydropneumatic tank expands forcing the water in the tank through the filter elements in a reverse path flushing all filter cake and retained solids out the drain. The backwash inlet valve is then closed and the filter vent and backwash flush valves are opened. The system is flushed for approximately one-half minute to make sure all spent cake is removed from the filter and drain piping and the backwash flush valve is closed and the drain valve in the filter outlet piping opened, to make sure the bottom head of the filter and the outlet piping are empty. Steam can be used in place of flush water to clean out the filter.

The filter drain filter vent and filter outlet drain valves are closed and the filter is now clean and empty, ready to be returned to service.

Various modifications of the process and apparatus of the invention may be made without departing from the spirit or scope thereof and it should be understood that the invention is intended to be limited only as defined in the appended claims.

What we claim is:

1. A process for removing suspended solids from a liquid without loss of heel portion comprising circulating a suspension of a precoat filter aid through a closed chamber provided with at least one vertical tubular, liquid pervious filter aid retainer supported on a tube sheet with the lower pervious section level with said tube sheet until a filter cake is formed on said retainer, pumping a liquid with suspended solids through the chamber whereby clear liquid passes through said filter cake into said retainer where clear liquid is recovered and suspended solids are deposited on filter cake, continuing pumping liquid with suspended solids until a maximum differential pressure is reached, reducing the pumping rate of liquid while simultaneously increasing air pressure to a maximum of 15 psig in the chamber, draining liquid from the chamber through the filter cake and retainer while maintaining air pressure of 2 to 15 psig to recover the heel portion, abruptly back washing liquid through the retainer and filter cake whereby the filter cake is destroyed and draining the mixture of filter cake and back wash liquid from the chamber.

2. The process of claim 1 wherein the filter aid is suspended in the liquid with suspended solids.

3. The process of claim 1 wherein the back wash liquid is in a reservoir under pressure of 60 to 100 psig.

4. An apparatus for filtration of suspended solids from liquids comprising a closed chamber provided with at least one vertical, tubular, liquid pervious filter aid retainer element supported on a horizontal tube sheet with the lowest pervious section being level with the tube sheet connected to tank for the liquid to be cleaned, means for removing cleaned liquid from the interior of retainer element, means for supplying air pressure to the closed chamber while simultaneously reducing the pumping rate of liquid, means for providing back wash liquid to the interior of the filter retainer element and means for draining the closed chamber.

5. An apparatus of claim 4 wherein the filter retainer elements are made of wedge wire.

* * * * *